April 25, 1961 F. FARKAS 2,981,262
CIGAR TIPPING MACHINES
Filed Feb. 26, 1958 6 Sheets-Sheet 5

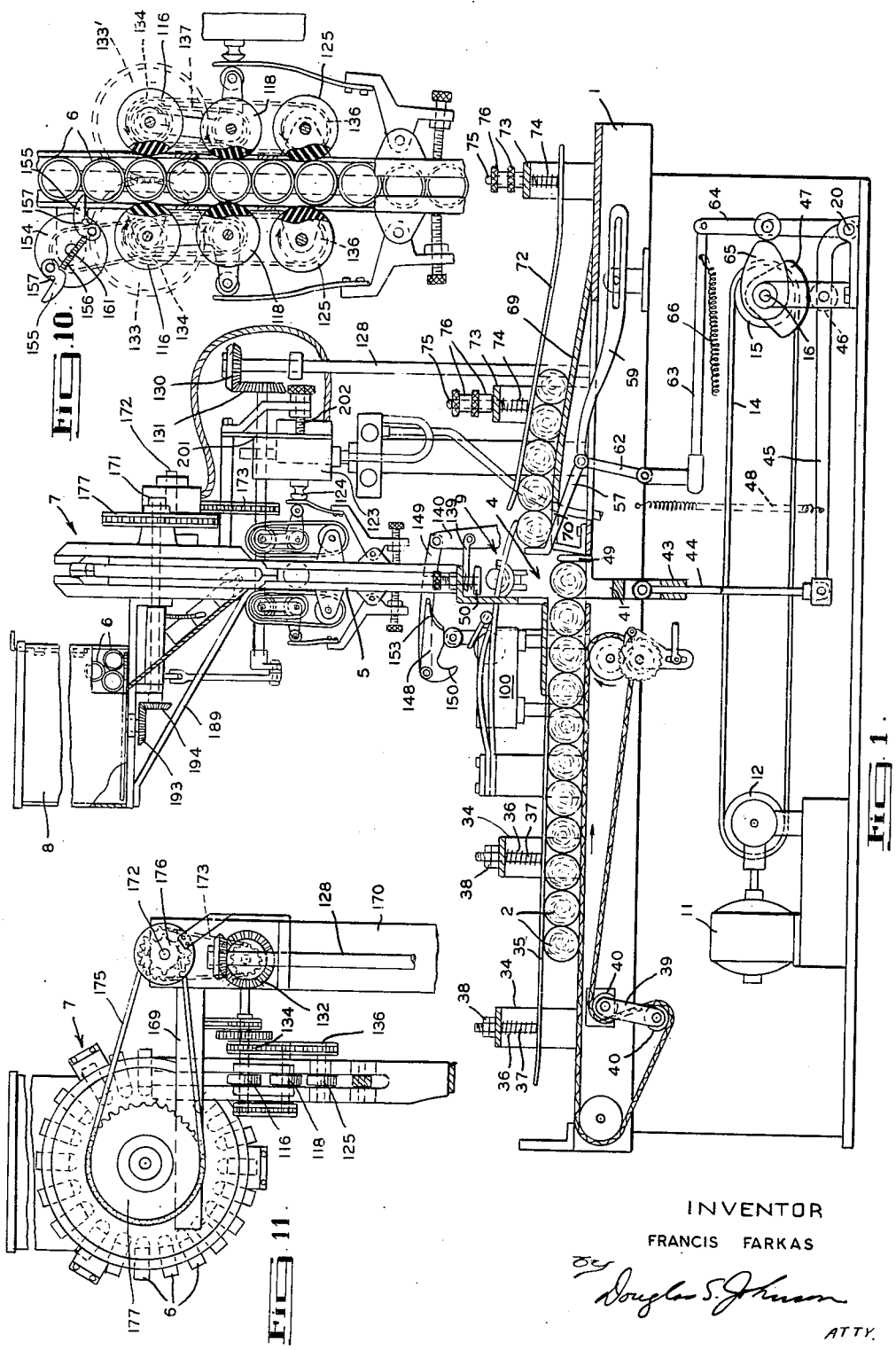

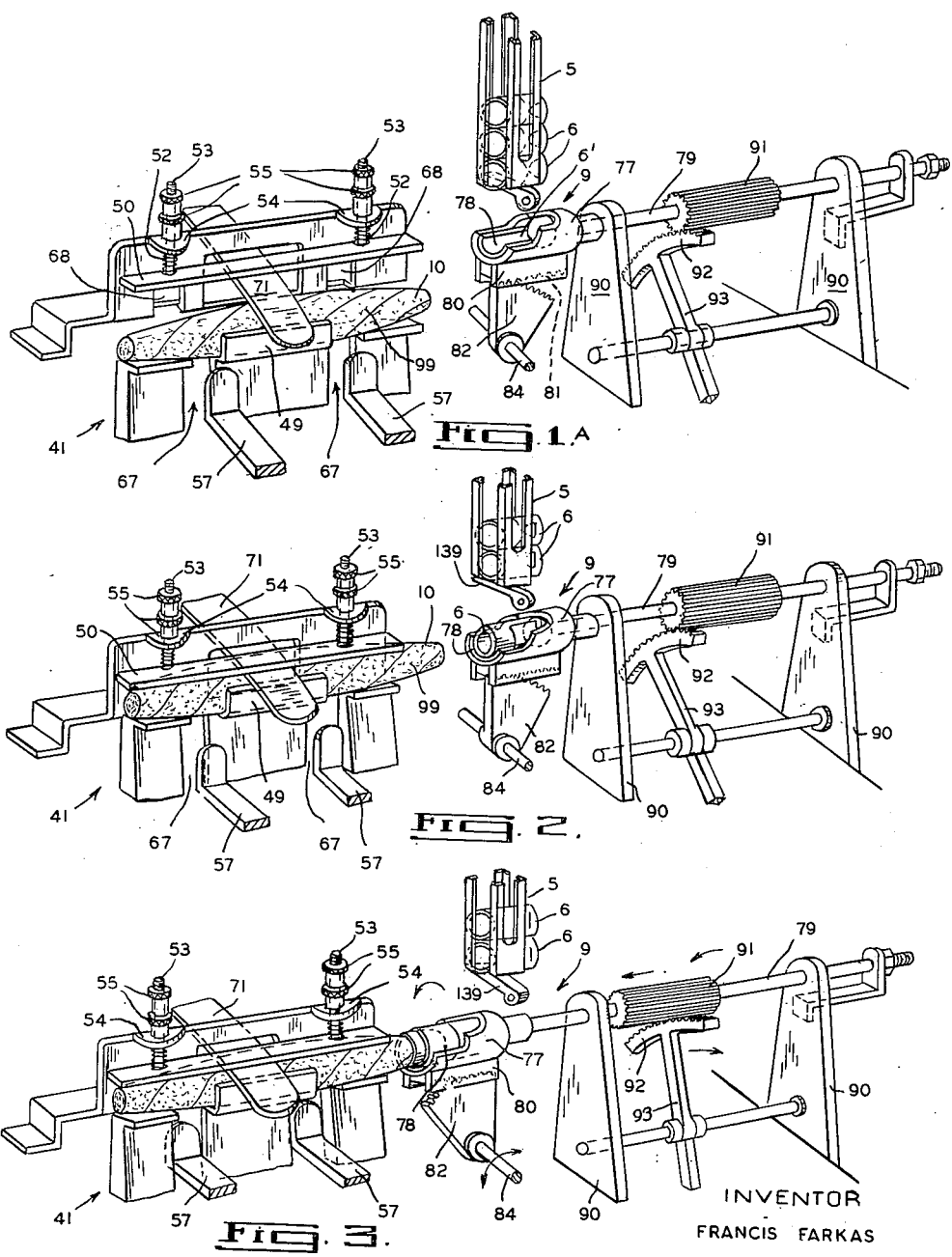

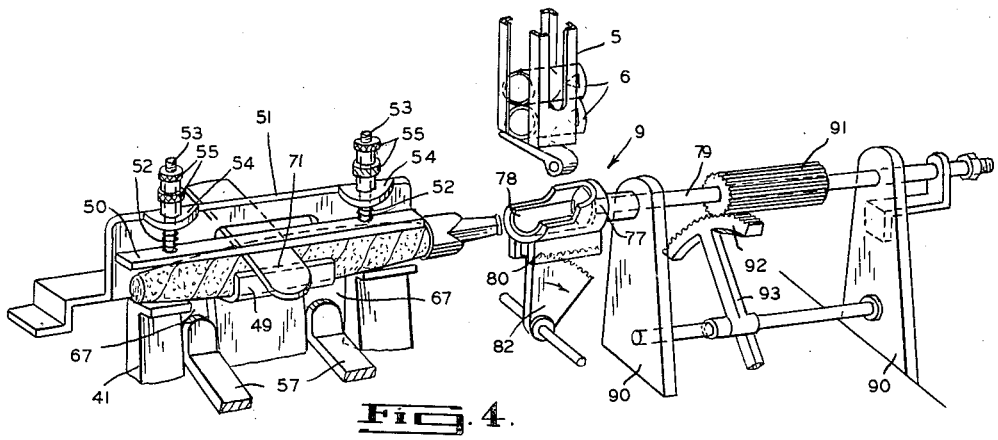
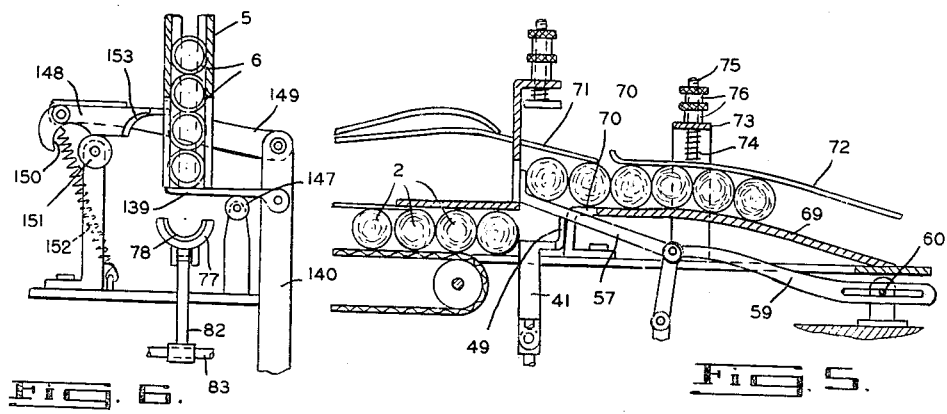
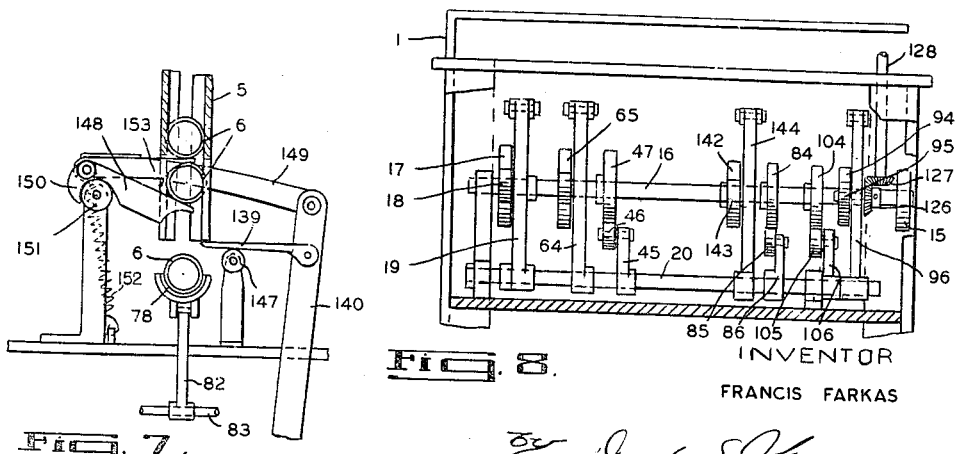

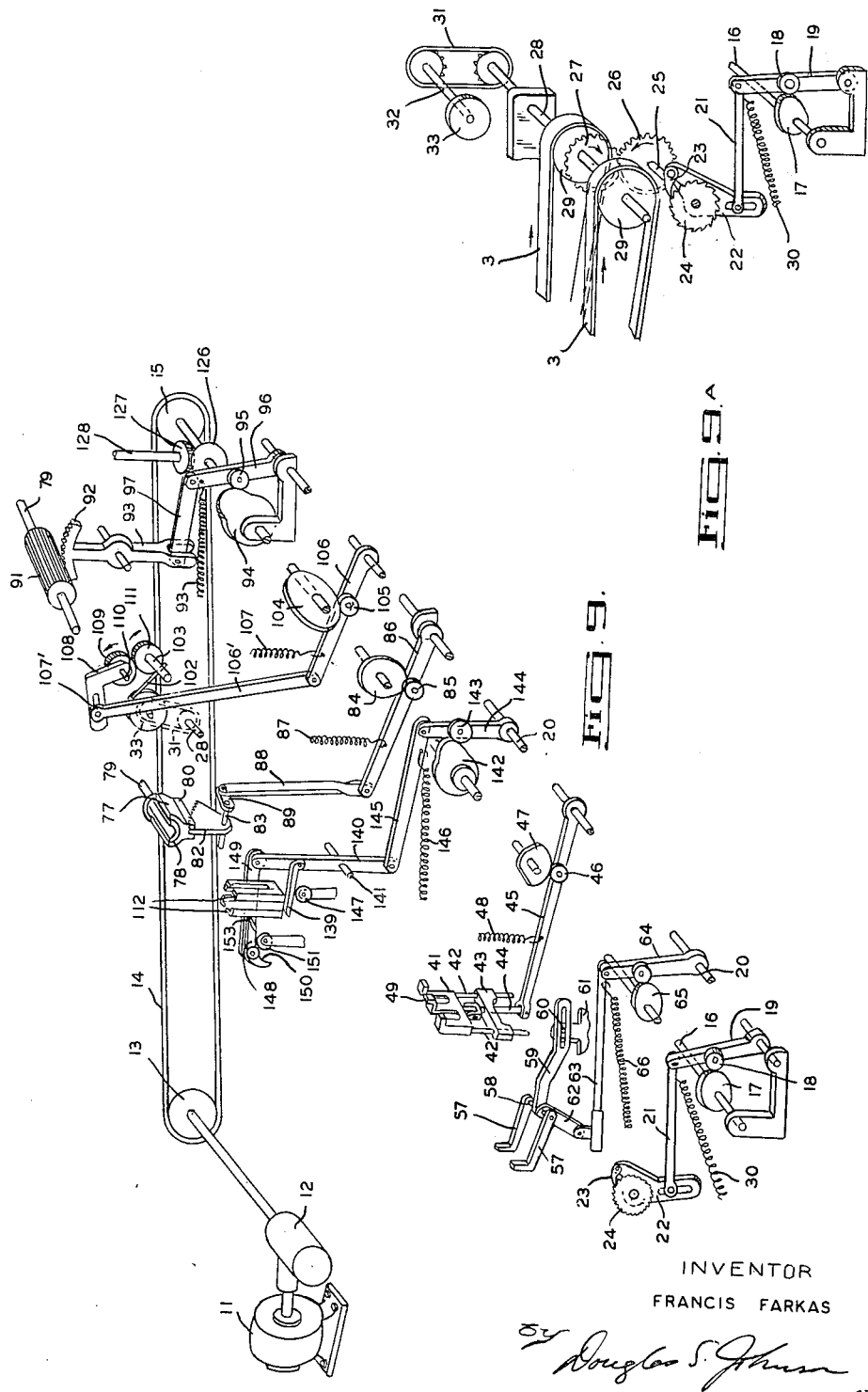

INVENTOR
FRANCIS FARKAS
ATTY.

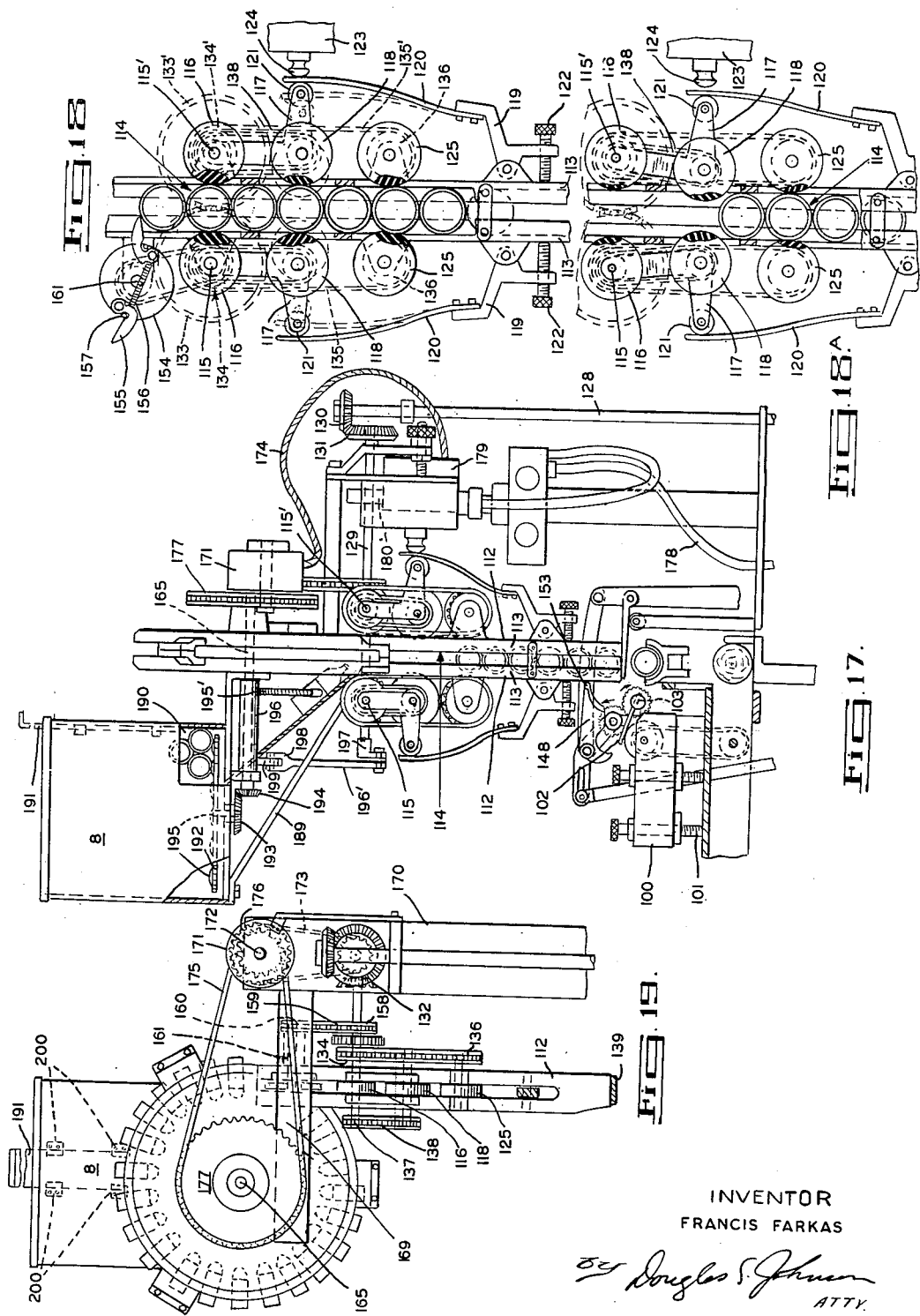

United States Patent Office 2,981,262
Patented Apr. 25, 1961

2,981,262

CIGAR TIPPING MACHINES

Francis Farkas, 95 Sheppard Ave. W., Willowdale, Ontario, Canada

Filed Feb. 26, 1958, Ser. No. 717,735

38 Claims. (Cl. 131—38)

This invention relates to a machine for placing holders or tips on the ends of cigars or the like.

The principal object of the invention is to provide a machine which will automatically apply cigar holders or tips to cigars in a reliable and positive manner without damage to the cigars or tips.

Another important object is to provide a machine as aforesaid having a high capacity output to provide an economical cigar tipping operation.

It will be understood that cigars are articles of a fragile nature and for economy, the cigar holders or tips must necessarily be inexpensive items, usually low-cost plastic mouldings or the like which are frangible in nature. Thus, a cigar tipping machine must bring together two articles which are susceptible to damage and fracture, and yet the cigar and tip must be positively assembled for reliable tipping operation. Moreover, by their nature, cigars are articles whose shapes cannot be precisely controlled to accurate tolerances. It is therefore a particular object of the invention to ensure proper alignment of the cigars and tips and also to provide a manner of tip application which will accommodate any inaccuracy in cigar shape without breaking the cigar wrapper.

Another particular object is to provide a machine which will positively deliver the frangible tips from a storage bin or hopper to the cigar tipping station with the tips in properly aligned position, yet will preclude jamming and consequent breakage of the tips.

In accordance with the invention, the cigars are delivered to a tipping station and means are provided to advance the tip onto the cigar with a combined translational and rotational movement whereby the tip is caused to slide over the cigar tip without peeling back or rupturing the outer surface or wrapper of the cigar. The rotational action also assists in centering the end of the cigar with respect to the tip being applied where there is any misalignment due to inaccurate cigar shape, and further, the rotational tip movement may be utilized to tighten the cigar wrapper at the end of the cigar.

Another feature of the invention in respect to the actual tipping operation resides in applying a suitable glue or adhesive to the end of the cigar immediately before the tip is advanced onto the cigar so that the glue in its fluid applied state may assist in the smoothness of tip application yet will quickly anchor the tip in position on the cigar.

A further important feature resides in the provision of a pick-up mechanism for selecting and orienting individual tips from a quantity of randomly disposed tips and delivering them to a guideway leading to the tipping station, and the provision of means which ensure positive delivery of the tips along the guideway to the tipping station and which, when a desired number of tips are accumulated in the guideway, will interrupt delivery by the pick-up mechanism to the guideway to prevent jamming and breakage of the tips.

More particularly according to the preferred form of the invention, the means for providing positive feed of the tips along the guideway comprises a sensing mechanism responsive to tip accumulation in the guideway and arranged to interrupt delivery from the pick-up mechanism.

Still another feature resides in forming the pick-up mechanism as a rotary device having tip receiving formations therein turning on a horizontal axis with a tip pick-up point at the bottom of its travel to which the tips are fed and a drop-out point at the top of its travel to drop out improperly oriented tips, the device being constructed and arranged so that correctly oriented tips are carried past the drop-out point, and providing track means to take the tips substantially tangentially off the device before they are returned to the pick-up point.

These and other objects and features of the invention will become apparent from the following detailed description taken in conjunction with the accompanying drawings, in which:

Figure 1 is a longitudinal vertical section taken at one side of the center line of a cigar tipping machine constructed to embody the invention, with parts being broken away for sake of clarity;

Figure 1A is a fragmentary perspective view taken at the tipping station of the machine and illustrating the first step of clamping the cigar prior to tipping;

Figure 2 is a view similar to Figure 1A, but showing the cigar clamped and a tip introduced into the tip carrier mechanism prior to advancement onto the exposed end of the cigar;

Figure 3 is a view similar to Figure 2, but illustrating the next successive step in which the tip has been advanced onto the exposed end of the cigar, the arrows illustrating the combined translatory and rotary movement of the tip;

Figure 4 is a further view similar to Figures 1A to 3, but showing the subsequent step in which the tip transfer or carrier mechanism has been retracted ready to receive a subsequent tip from the magazine;

Figure 5 is a fragmentary vertical section to one side of the center line taken at the tipping station illustrating the relationship of the parts in the next successive step after the retraction of the tip carrier mechanism of Figure 4 to remove the tipped cigar from the tipping station;

Figure 6 is a fragmentary part-elevational, part-vertical sectional view of the tip transfer or carrier mechanism, and the lower end of the tip magazine and illustrating the selector fingers for controlling tip feed from the magazine to the carrier mechanism;

Figure 7 is a view similar to Figure 6, but showing the selector fingers actuated to introduce a tip into the carrier mechanism;

Figure 8 is an elevational view of the cam shaft and cams thereon for operating the various machine mechanisms, parts of the support frame being broken away and in section;

Figure 9 is a more-or-less diagrammatic exploded perspective view of the cam shaft, cams and drive mechanisms for the various machine operations;

Figure 9A is a more-or-less diagrammatic perspective view illustrating the drive to the cigar feed and gluing roll;

Figure 10 is a fragmentary elevational view of a portion of the tip magazine with parts broken away for clarity;

Figure 11 is an elevational view of the tip magazine taken at right angles to Figure 10 and showing the tip delivery mechanism for delivering tips into the magazine and drive therefor, with the tip supply container broken away;

Figure 17 is an enlarged elevational view of the tip magazine, tip delivery mechanism and the drive therefor, and showing the relationship between the magazine, gluing mechanism and tipping station, the machine being broken away in the vicinity of the tipping station;

Figure 18 is a fragmentary part-elevational, part-vertical sectional view on an enlarged scale of the tip magazine illustrating the tip feeding means and their relationship with an accumulation of tips in the magazine;

Figure 18A is a view similar to Figure 18, but showing the relationship of the parts after a number of tips have been delivered from the magazine, and Figure 19 is an elevational view of the magazine taken at right angles to Figures 18 and 18A and showing the drive for the tips to move them through the magazine.

Figure 12:
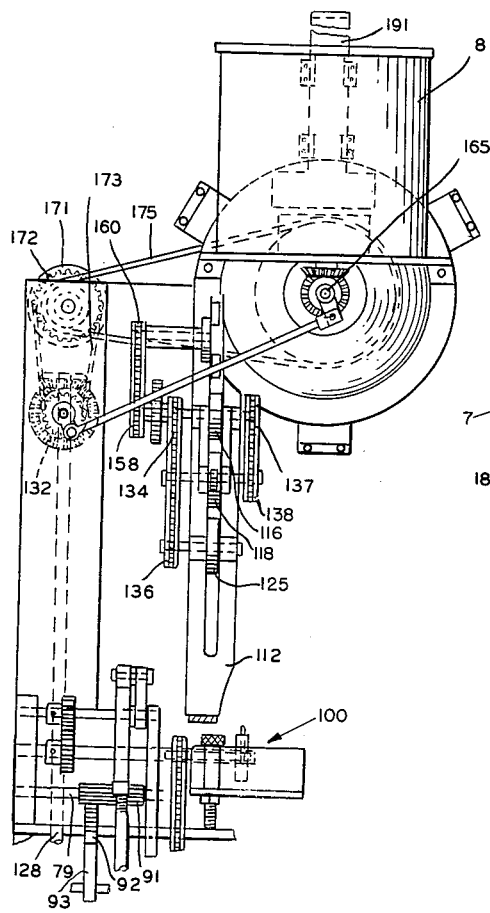
Figure 12 is an elevational view of the tip magazine and delivery mechanism taken from the opposite side to Figure 11, and showing in fragmentary form the gluing roller and drive therefor.

Referring first to Figure 1, the machine comprises a main longitudinal table 1, along which cigars 2 are adapted to be fed by means of endless belts 3 (see Figure 9A) to a tipping station generally designated at 4. Supported from the table 1 is a magazine designated generally at 5 which receives mouthpieces or tips 6 from a rotary delivery mechanism generally designated at 7 which transfers the tips from a storage container 8 to the magazine. A carrier or transfer mechanism, generally designated at 9 and seen particularly in Figures 1A to 4, is arranged to transfer the tips 6 from the magazine 5 and apply them to the exposed end 10 of a cigar disposed at the tipping station 4, after which the cigar is removed from the tipping station preparatory to the advance of a subsequent cigar thereto.

Cigar feed

The machine is driven from a suitable electric motor 11, Figures 1 and 9, which drives through a suitable clutch and reduction gear assembly 12 a pulley 13, which in turn, through a belt 14 and pulley 15 drives a cam shaft 16, on which are mounted the various cams for controlling machine operation. As shown in Figure 9, and particularly in Figure 9A, adjacent to one end of the cam shaft 16 is a cam 17 engaging a roller 18 carried on an arm 19 pivoted on a shaft 20 at its lower end. The upper end of the arm 19 is connected by a rod or pitman 21 with a lever 22 carrying a pawl 23 adapted to cooperate with a ratchet wheel 24, the lever and ratchet wheel being mounted on a shaft 25 carrying a pinion 26 meshing with a pinion 27, Figure 9A, mounted on a shaft 28 carried by the table 1, and this shaft 28, in turn, carries drive rollers 29 over which pass the endless belts 3.

The feed achieved with the above-described mechanism is an intermittent one, whereby cigars are fed periodically into the tipping station 4. This periodic feed is achieved since on rotation of the cam shaft 16, the cam 17 causes rocking of the arm 19 in a clockwise direction against the action of spring 30 at the time the enlarged part of the cam engages the roller 18. This action causes a counter-clockwise movement of the lever 22, which in turn, through operation of the pawl 23, imparts a counter-clockwise rotation to the shaft 25, and a clockwise rotation, in turn, through the pinion drive to the roller shaft 28. As the arm 19 is rocked counter-clockwise by the spring 30 as the enlarged portion of cam 17 moves off the roller 18, the pawl 23 will be moved in a clockwise direction to ride over the teeth of the ratchet wheel 24.

Driven from the shaft 28 through a chain and sprocket drive 31, Figure 9A, is a shaft 32 carrying a gluing wheel 33 forming part of the gluing mechanism hereinafter described for applying glue to the exposed end of a cigar prior to the placing of a tip thereon.

In their travel longitudinally of the table 1, the cigars 2 are disposed with their axis extending transversely of the table and transversely of the direction of movement of the belts 3, and it will be understood that suitable guides will be provided to guide the cigars in their movement longitudinally of the table. In this connection, as shown in Figure 1, the table 1 carries a plurality of supporting bridges 34 from which is supported a guide strip 35 resiliently urged downwardly against the cigars on the table by springs 36 mounted on posts 37 which extend upwardly through the supporting bridges 34 and have threaded upper ends carrying adjusting nuts 38. A suitable tensioning device comprising a pivotal arm 39 carrying idle rollers 40 is provided for tensioning the belts 3.

Cigar clamping mechanism

At the tipping station area designated at 4 the cigars are fed onto a retracted elevator 41, Figures 1 and 9, which is mounted for vertical reciprocation by means of guide rods 42 passing through a guide bracket 43. The elevator 41 is actuated by means of a plunger 44 operating through guide bracket 43 and pivotally connected to an arm 45 pivotally mounted on the shaft 20, the arm carrying a roller 46 engaging with the cam 47 mounted on the cam shaft 16, the cam being formed to displace the arm 45 downwardly against the action of a spring 48. The shape of the cam 47 and its disposition on the shaft 16 is such that the elevator 41 is in its lowermost or retracted position shown in Figure 1 as the belts 3 deliver a cigar to the tipping station so that the cigar is received on the top of the elevator and abuts a locating flange 49 provided on the elevator.

The elevator operates up through a suitable opening in the table 1 and, after the reception of the cigar 6 on the top thereof, carries the cigar upwardly from the position of Figure 1A to the position of Figure 2 against a clamp bar 50 resiliently supported from a bracket 51 supported from the table 1 to bridge the belts 3. Springs 52 encircling posts 53 slidably supported in lugs 54 carried by the bracket 51 urge the clamp bar 50 downwardly to the limit position as determined by the adjusting nuts 55 threaded on the threaded upper ends of the posts 53.

Following the raising of the elevator 41 to effect clamping of the cigar against the resiliently supported clamp bar 50, the elevator is arranged to remain stationary with the cigar supported so that it presents a free end 10 exposed clear of the table 1 and elevator in position to receive a tip 6. Glue is then preferably applied to this free end prior to tipping.

Cigar take off

Following the application of the tip 6 to the cigar 2, the cigar is removed from the tipping station 4 by means of fingers 57 shown in Figures 1 and 5 and particularly in Figure 9. The fingers 57 are anchored to a bar 58 which is rigidly connected to a guide arm 59 having a pin and slot connection 60 with a fixed part 61 of the machine table. Depending from the bar 58 is a pivotally supported rocker arm 62 which is connected through a rod or pitman 63 with a roller carrying arm 64 mounted on shaft 20.

The arm 64 is actuated by means of a cam 65 mounted on the cam shaft 16, the roller of the arm 64 being held in contact with the cam surface by means of a spring 66. The shape of the cam 65 and its disposition on the cam shaft 16 is such as to cause the fingers 57 to move to the left as seen in the figures, and upwardly through slots 67 provided in the elevator 41 and suitable slots 68 provided in the bracket 51 as the elevator reaches and is held at the cigar clamping position of Figures 2 and 3. In this way the fingers 57 are moved beneath the cigar and up to a position to the left of the cigar.

Following tipping of the cigar, the elevator 41 is retracted, leaving the cigar supported on the fingers 57 as the elevator moves below the fingers, and when the elevator locating flange 49 clears below the fingers 57 the fingers are caused to move to the right as seen in the figures, whereby the previously tipped and now supported cigar is carried by the fingers to the position shown in Figure 1 onto a ramp 69 having suitable slots 70 through which the fingers are retracted as they move to the right and downwardly as guided by the pin and slot connection 60. If desired, a suitable light flat spring 71 may be employed to hold the cigar on the fingers 57 during transfer, and as the tipped cigars are fed down the ramp 69 they may be suitably guided, for instance, by means of a strip 72 resiliently supported from brackets 73, Figure 1, and urged downwardly by springs 74 mounted on posts 75, the upper ends of which are threaded to receive adjusting nuts 76.

*Tip carrier or transfer mechanism*

The tip carrier or transfer mechanism, generally designated at 9, for carrying the tips 6 from the magazine 5 and applying them to the exposed cigar end 10 is best shown in Figures 1A to 4 and Figure 9. The mechanism comprises an outer partial sleeve carrier member 77 having the upper side cut out in a shape to receive a tip 6 from the magazine. Rotatably mounted within the outer partial sleeve is an inner corresponding partial sleeve carrier member 78 mounted on a shaft 79 which is supported opposite to the tipping station 4 for axial movement substantially on the axis of a clamped cigar following the raising of the elevator 41, as shown in Figures 2 to 4.

The outer carrier member 77 has a depending channel 80 between the walls of which is disposed a rack bar 81 engaging with a rack member 82 mounted on a rock shaft 83. The drive to the rack member 82 is effected, as shown in Figure 9, by a cam 84 mounted on the cam shaft 16 and engaging a roller 85 mounted on an arm 86 pivotally mounted on the shaft 20. A spring 87 maintains the roller 85 in contact with cam 84.

Pivotally connected to the end of arm 86 is a rod 88 which, in turn, is pivotally connected to a rock arm 89, whereby the rack member 82 is rocked back and forth upon rotation of the cam 84. The shape and disposition of the cam 84 on the cam shaft 16 is such that the outer carrier member 77, as guided by shaft 79 which is slidably supported by spaced supporting brackets 90 carried by the table 1, is caused to move axially of and towards the cigar at the tipping station 4 after the cigar has been clamped.

Thus, a tip 6, which has been dropped through the correspondingly cut out outline 6′ in the sleeve members 77 and 78 into the inner sleeve member 78, is advanced onto the end of a cigar while the cigar remains stationary in the clamped position with its end 10 exposed, and then prior to the lowering of the elevator 41, the partial sleeve carrier members 77 and 78 are retracted towards the initial position beneath the magazine 5.

The inner partial sleeve 78, which is rotatable within the outer sleeve 77, carries a longitudinal gear 91 on its shaft 79 and meshing with this gear is a sector-shaped gear 92 mounted on the end of a lever arm 93 which is actuated by means of a cam 94 mounted on the cam shaft 16. This cam 94 engages a roller 95 carried on an arm 96 mounted on shaft 20 and an arm 97 pivoted to arm 96 and the lower end of the lever arm 93 effects rocking of the sector gear 92 on rotation of the cam shaft 16. A spring 93 urges roller 95 into engagement with the cam 94. The cam 94 and its disposition on the cam shaft 16 is such that when the carrier members 77 and 78 are retracted to their position beneath the magazine 5, as shown in Figures 1A and 2, the inner partial sleeve member 78 is turned so that its shaped cut out 6′ registers with the cut out opening in the top of the outer partial sleeve carrier member 77, whereby a tip can be delivered through the outer sleeve into the inner sleeve.

As the outer sleeve 77 carrying the inner sleeve 78 therewith is advanced axially towards the exposed end 56 of the cigar, the inner sleeve 78 is caused to rotate through the meshing of the sector gear 92 with the longitudinal gear 91 imparting a rotative motion to the tip as it is fed onto the end of the cigar to facilitate its passage over the cigar end. Thus, the tip has imparted to it a translatory and rotational movement as it is fed onto the exposed cigar end 56.

Following the application of the tip to the cigar the outer carrier member 77, carrying the inner carrying member 78 therewith, is retracted as above explained, and at the same time the rotational movement imparted to the inner sleeve 78 is reversed to bring its cut out opening 6′ into registry with the opening in the outer sleeve 77 at the magazine station of Figure 1A. It will be noted that the longitudinal gear 91 permits the translation of the carrier members 77 and 78 while mesh is maintained with the sector gear 92. It will also be noted that the inner sleeve 78 and hence the tip 6 has a counter-clockwise rotation as the tip is advanced onto the exposed end of the cigar, and preferably this rotation is arranged to tighten the outer wrapper 99 of the cigar.

*Gluing mechanism*

Preferably an adhesive or glue is deposited on the exposed end 10 of the cigar immediately prior to the tipping operation with the adhesive being deposited in the state whereby it will act, in effect, as a lubricant to facilitate the application of the tip, and will thereafter quickly exhibit sufficient tackiness to hold the tip on the cigar end, adding to the friction force developed by the telescoping of the end into a right fit within the applied tip 6.

As best seen in Figures 1, 12 and 17, there is provided on the table 1 a glue pot 100 in which the previously described gluing roller 33 is adapted to operate to pick up a quantity of glue on the periphery thereof as it is rotated in conjunction with the belt drive, which advances the cigars to the tipping station. The glue pot may, if desired, be adjustably mounted on suitable threaded posts 101 as shown in Figure 17.

The glue is picked off from the periphery of the roller 33 by means of a thin arm, preferably a short length of wire 102, mounted on a rock shaft 103 which is driven by means of cam 104 mounted on cam shaft 16 as follows: Cam 104 engages a roller 105 carried by an arm 106, urged by spring 107 in a direction to maintain contact of the roller 105 with the cam 104. A pitman or rod 106′ is connected by means of a loose connection 107′ with a rock arm 108, Figure 9, which is arranged to reciprocate a pinion 109 mounted on shaft 110, the pinion meshing with a corresponding pinion 111 mounted on the rock shaft 103. The cam 104 and its disposition on the cam shaft 16 is such that the arm or wire 102 is caused to swing from a point engaging the gluing roller 33 into engagement with the exposed end 10 of the cigar immediately prior to the application of the tip thereto, and to move out of the path of the tip and carrier mechanism 9 prior to the tip reaching the cigar end.

*Magazine and magazine feed*

The magazine generally designated at 5 comprises a pair of slotted longitudinal bars 112 vertically disposed in spaced face to face relation. The bars 112 are formed to present flanges 113 whereby there is formed between the bars a vertical channel or guideway 114 to receive the cylindrical portion *a* of the tip 6 while the reduced mouthpiece portion *b* projects rearwardly through the opposed flanges 113.

Figure 13:
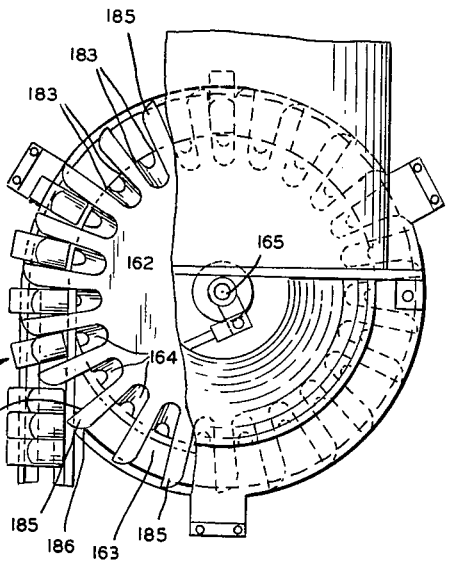
Figure 13 is an enlarged elevational detail of the tip delivery mechanism with portions being broken away to show the rotary selector and delivery disc.

The tips 6 are fed into the magazine at the upper end thereof by means of the delivery mechanism 7, as hereinafter more fully described, and as seen in Figure 13, and the tips are disposed to move vertically downwardly from the upper or inlet end of the magazine to the lower or delivery end. However, to prevent any jamming caused by slight disorientation of the light frangible tips 6 in the guideway, means are provided for frictionally advancing the tips through the magazine between the entry and delivery ends.

As seen particularly in Figures 1, 10, 17 and 18, mounted in suitable bosses adjacent to the upper end of the magazine are shafts 115 and 115′ which support resilient friction rollers 116, Figures 12 and 19, disposed to enter through the slotted bars 112 to resiliently and frictionally engage tips within the vertical channel or guideway 114 as shown in Figure 18. Also pivotally mounted on the shafts 115 and 115′ are L-shaped roller carriers 117, in which are journalled at the angles thereof resilient friction rollers 118 corresponding to the rollers 116. Again, these rollers 118 are adapted to enter the slotted bars 112 into the vertical channel or guideway 114, and to frictionally engage tips within the channel.

Pivotally mounted at a distance below the rollers 118 on opposite sides of the magazine are lever arms 119 which carry flat spring members 120, which engage on rollers 121 carried at the outer extremities of the L-shaped roller carriers 117. Adjusting screws 122 are provided to adjust the spring tension applied through the springs 120 and rollers 121, urging the rollers 118 into frictional contact with tips within the magazine.

As shown in Figure 18A, when the upper portion of the magazine is empty, the rollers 118 will move to their most adjacent position, and a switch 123 having a push-button contact 124 is disposed in relation to one of the springs 120 and rollers 121, so that with the rollers 118 in the position of Figure 18A the latter spring member 120 is out of contact with the switch push-button 124. Upon accumulation of tips in the magazine to the position of Figure 18 to force the rollers 118 apart the latter spring member 120 is forced outwardly by its roller 121 to actuate the switch contact 124 to energize the control circuit to interrupt tip delivery to the magazine as hereinafter more fully described.

Pivotally mounted below the rollers 118 are further resilient friction rollers 125 which again are disposed to enter through the slotted bars 112 and frictionally engage the tips within the magazine. The drive to the pairs of rollers 116, 118 and 125 is obtained through a bevelled gear 126 mounted on the cam shaft 16, Figure 9, which engages a bevelled gear 127 driving a vertical shaft 128. As shown particularly in Figures 11, 12, 17, 18, and 19, this vertical shaft 128 drives a horizontal shaft 129 through suitable bevel gears 130, 131, and the shaft 115 is driven from the horizontal shaft 129 by means of suitable bevelled gearing indicated at 132.

The shaft 115 carries a gear 133 which meshes with a corresponding gear 133′ on shaft 115′, whereby the two shafts 115 and 115′ are driven in unison and in opposite directions to achieve frictional feed of the tips down the magazine. Mounted on each of the shafts 115 and 115′ are suitable drive members preferably sprocket wheels 134, 134′ which drive through chain drives 135, 135′ sprocket wheels 136 mounted on the shafts of rollers 125 whereby the upper and lower pairs of rollers 116 and 125 are driven in unison.

The shafts 115 and 115′ also carry at the opposite side of the magazine sprocket wheels 137 which drive through suitable chain drives 138 the shafts of the resilient friction rollers 118, whereby these pivotally supported intermediate rollers are also driven in unison with the rollers 116 and 125.

As shown in Figures 1 to 4, 6 and 17, the tips are frictionally fed down the magazine to engage a finger 139 which normally extends across the bottom or delivery end of the magazine, providing a stop for correctly locating the bottom-most tip at which might be termed a delivery station preparatory to its being delivered to the tip carrier or transfer mechanism previously described.

As shown in Figure 9, the finger 139 is pivotally connected to a lever arm 140 having a fulcrum 141 and the lever arm, in turn, is rocked by means of a cam 142 mounted on the cam shaft 16 to engage the roller 143 carried by an arm 144 on the shaft 20. The arm 144, in turn, is connected to the lever 140 by means of a rod or pitman 145. A spring 146 acts to maintain the roller 143 in engagement with the cam 142. The shape of the cam 142 and its disposition on the cam shaft 16 is such that the finger 139 extends across the bottom of the magazine during the period that the tip carrier mechanism is advanced towards a clamped cigar and retracted to a position beneath the magazine and finger, with the cut out 6′ in the sleeves 77 and 78 vertically registering with the tips in the magazine. (See Figure 6.)

At this time, as shown in Figure 7 particularly, the finger 139 is rocked clear of the lower or delivery end of the magazine as guided by a guide roller 147 allowing the lowermost tip to drop into the carrier mechanism. Preferably, although not essential, a second finger 148 is utilized to support the remainder of the tips in the magazine during the drop out of the bottom tip. The finger 148 is pivotally mounted on an arm 149 carried at the upper end of the lever 140. The finger 148 has a cam surface 150 which is adapted to cooperate with a roller 151 to swing the finger downwardly to the position of Figure 7, under action of a spring 152. With this arrangement, a force is imparted to the lowermost tip to positively eject it into the carrier or transfer mechanism 9, while the second to the last tip is held from ejection.

As shown in Figure 7, the arm 149 also carries a third finger 153 which is located behind finger 148 and which is adapted to enter horizontally between the second to the last and the remaining tips in the stack to isolate the second to the last tip from the force of the drive of the friction rolls as the fingers 139 and 148 start their movement towards the position of Figure 6.

At the upper end, as shown in Figures 10 and 18 particularly, there is provided a further tip drive in the form of a wheel 154 carrying pivotal fingers 155 arranged at diametrically opposite positions which are connected by an extension spring 156 under tension causing fingers 155 to orient themselves somewhat radially of wheel 154, which upon wheel rotation projects them into the guide channel 114 and advance the tips with an appreciable positive force between the first set of friction rollers 116 so that the rollers have an opportunity to adequately grip the tips being fed thereto and frictionally deliver them down the magazine.

Stops 157 limit the position of the fingers under the action of the spring in one direction and it will be understood that the fingers are retractable upon accumulation in the magazine so that the tips will not be fractured should such an accumulation occur. The drive for the wheel 154 is obtained through a sprocket wheel 158 mounted on the shaft 115 which drives through a chain drive 159 a sprocket wheel 160 mounted on a shaft 161 carrying the wheel 154.

Tip delivery mechanism

Figure 15:
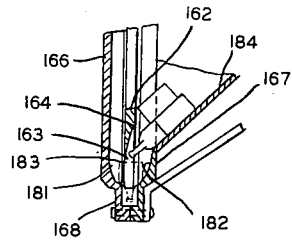
Figure 15 is a fragmentary vertical section showing the relationship of the rotary tip delivery disc, the inner guide ring and outer cover disc.
Figure 14:
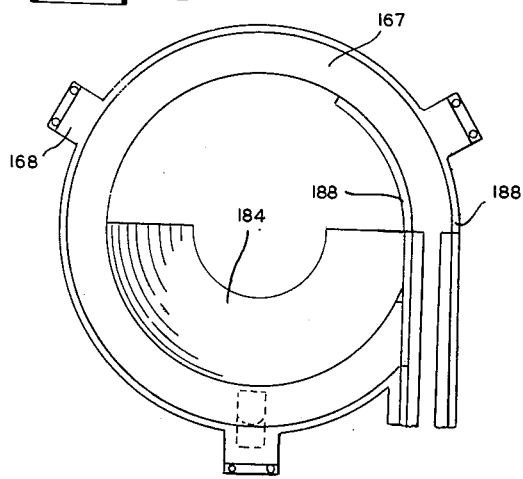
Figure 14 is an eleavtional view looking at the inside face of the inner guide ring which cooperates with the rotary tip delivering disc.
Figure 16:
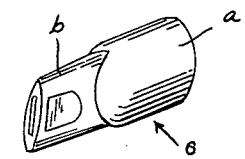
Figure 16 is a perspective view of a typical tip or mouthpiece which the machine is adapted to apply to the end of a cigar.

The tip delivery mechanism comprises a rotary disc 162, as best seen in Figures 13 and 15, which disc has a plurality of pockets 163 extending radially inwardly from the periphery thereof, the pockets extending the thickness of the disc adjacent to the periphery and then being sloped as at 164 inwardly of the periphery. The thickness of the disc 162 is substantially less than the diameter of the cylindrical portion a of the tips 6 so that the tips, when properly oriented in the pockets, project on opposite sides of the disc, as shown in dotted line in Figure 15.

The disc 162 is arranged to rotate on a horizontal shaft 165 between an outer cover disc 166 and an inner guide ring 167, the cover and ring being secured together by means of suitable peripheral lugs 168 in spaced relation on opposite sides of the disc 162 as shown in Figure 15. The assembly comprising the rotary disc 162 and shaft 165 and cover 166 and guide ring 167 is supported by means of an arm 169, Figure 11, from an upright support structure 170, carried by the table 1.

The upright support structure 170 carries horizontal shaft 129, and also supported from the structure is a clutch assembly 171 associated with a horizontal shaft 172. The clutch assembly is preferably a solenoid operated clutch, such as sold by Warner Electric Brake and Clutch Company, Beloit, Wisconsin, model PC500, and the clutch is driven through a suitable sprocket drive 173. Preferably the clutch structure is arranged so that it normally drives horizontal shaft 172 until it is energized by the application of a voltage thereto through the line 174 to declutch the shaft 172. A sprocket drive 175 provides a drive between a sprocket wheel 176 mounted on shaft 172 and a sprocket wheel 177 mounted on the rotary disc shaft 165.

The clutch assembly 171 mentioned above is the type actuated by direct current, and this clutch is adapted to be energized in accordance with actuation of the sensing mechanism in the form of the switch 123 and 124, and pivotally mounted rollers 118, whereby upon accumulation of tips in the magazine to the position of Figure 18 as previously discussed, the switch 123 is actuated to apply an alternating current voltage from supply lines 178 to a rectifier 179 including rectifier tube 180, whereby a D.C. voltage is applied by a line 174 to the clutch to disconnect drive to the shaft 172 and hence through the sprocket drive 175 to the disc shaft 165 to interrupt disc rotation.

It will be seen particularly from Figure 15 that the outer cover disc 166 and the inner guide ring 167 are contoured as at 181 and 182 respectively to receive the cylindrical portion $a$ of the tip 6 when the tip is properly oriented in one of the pockets, that is, with the tip at the bottom of the rotary disc 162 oriented with its mouthpiece portion $b$ downwardly and its cylindrical portion disposed upwardly and extending on opposite sides of the disc 162 and engaging beneath the disc shoulder 183. In this arrangement, as the disc rotates, the tips are carried upwardly between the guides formed by the cover and guide ring and resting on the pocket shoulders 183 in the rotating disc are supported at the top of the rotating disc from falling downwardly under gravity. Any tip which is not properly oriented will not seat beneath the disc shoulders 183 so that as it arrives towards the top of the path of the rotating disc movement, it will slip out the sloped or contoured portion 164 and will not be retained in the pocket.

The inner ring 167 carries a shute 184 to guide a mass of tips to the portion of the rotating disc 162 arriving at the bottom of its path of travel, and the tips which are not properly oriented and which drop out adjacent to the top of the disc travel will drop back into the shute or hopper 184.

As seen in Figure 13, the rotary disc 162 is adapted to rotate in a counter-clockwise direction, and the finger projections 185 which define the pockets 163 are shaped to present a rounded leading edge 186 and a straight trailing edge 187 to facilitate entry and maintenance of the tips in the pockets. At one side remote from the point of tip pick-up in respect of the direction of rotation of the disc 162 at least the inner guide ring 167 is provided with guide flanges 188 which define a substantially tangential trackway leading off from the contoured portion 182 of the disc, which trackway forms the means of taking the tips out of the pockets 163 as shown in Figure 13. This trackway 188 is arranged in vertical registration with the magazine guideway 114 whereby the tips are delivered into the magazine under the positive action of the fingers 185 defined on the rotary disc 162 in conjunction with the action of the rotating wheel 154.

It will be understood that since the tips 6 are fragile, jamming would occur if the disc 162 fed tips into the magazine at a rate faster than the delivery of the tips from the magazine into the carrier or transfer mechanism 9 in the absence of the sensing mechanism and clutch assembly 171 above described. This jamming would cause fracture of the tips which could not be tolerated. On the other hand, if the rate of delivery from the rotary disc 162 into the magazine were slower than the rate of delivery to the carrier mechanism 9, the carrier mechanism would be starved, and of course, since the rotary disc 162 and associated parts is dependent upon an average of the number of tips which will correctly orient themselves and drop into the pockets 163 beneath the shoulders 183, it would be impossible to have precisely the same feed into and from the magazine.

The disc 162 is thus arranged to deliver at a higher rate into the magazine than the rate of delivery of tips from the magazine into the carrier mechanism, and fracture of the tips is prevented by the provision of the accumulation sensing mechanism above described. The tips are fed into the shute 184 from the storage container 8 which is supported by an arm 189, Figures 1 and 17, the mass of randomly disposed tips being delivered through an opening 190 into the shute, which opening may be closed by a slidable gate 191. To provide agitation of the tips in the container 8 and effect their discharge into the shute 184, a disc 192 is rotatably mounted at the bottom of the container, the disc being driven by a bevelled gear 193 meshing with a bevelled gear 194, carried by the rotary disc shaft 165. The bosses 195 on the disc 192 provide the agitation and the tips will be tumbled out into the shute. It will be understood that the disc 192 is operated only during such time as the rotary disc 162 is operated to deliver tips to the magazine.

Mounted on the disc shaft 165 is a sleeve 196 which projects into the shute 184, and this sleeve carries a finger 195′ which is adapted to be reciprocated continuously to cause reorientation of the tips in the shute so that they will not become jammed in any particular orientation. The rocking or oscillation of the finger 195′ is achieved by means of an arm or rod 196′ mounted on horizontal shaft 129, the arm being pivotally connected at its lower end to a crank arm 197, the arm 196′ having a forked end 198, see Figures 1 and 17, which forked end is pivoted to a lug 199 carried by sleeve 196. Rotation of the shaft 129 which causes the lower end of rod 196′ to follow a circular path, and displacing forked end 198 which through its pivotal connection to lug 199 carried by sleeve 196 imparts an oscillating or rocking movement to the aforementioned sleeve 196.

Operation

To put the machine in operation the gate 191 is lifted clear of the opening 190 as guided by the guides 200, and assuming that there is not an accumulation of tips in the magazine, the embossed disc 192 will be operated in conjunction with the rotary disc 162 to deliver tips from the storage container 8 to the shute 184 and from the shute via the rotary disc 162 and guide cover and ring 166 and 167, and take-off trackway 188 into the magazine guideway 114. The tips then will be delivered through the guideway by means of the friction rollers 116, 118 and 125 against the finger 139 at the bottom of the magazine.

During this period, cigars are being advanced periodically towards the tipping station 4, and as a cigar reaches the elevator 41 the finger 139 and associated fingers 148 and 153 will be operated to deliver the lowermost tip in the magazine to the carrier or transfer mechanism 9. During this transfer of the tip to the carrier mechanism, the cigar will be moved upwardly by the elevator 41 to the clamped position of Figure 2 with the end 10 exposed for tipping. Then the wire 102 is operated to apply glue to the exposed cigar end 56 following which the carrier mechanism 9 advances the tip with a combined axial and rotational movement onto the exposed end of the cigar and when the tip has been seated firmly home on the cigar end and anchored there by the frictional grip with the cigar and the additional grip of the tacky adhesive, the carrier mechanism 9 is retracted, and the fingers 57 which have previously been fed beneath and behind the cigar are operated to remove the cigar and carry it down the ramp 69.

Upon return of the tip carrier mechanism 9 to its position vertically beneath and in registration with the magazine guideway 114, a subsequent tip is delivered into the carrier mechanism, while a subsequent cigar is fed onto the retracted elevator and then moved upwardly to the clamped position for the next successive tipping operation. As soon as the higher speed tip delivery mechanism comprising the disc 162 and associated parts has delivered sufficient tips into the magazine to accumulate them to a point to spread and hold rollers 118 apart, this tip delivery mechanism will operate in conjunction with the tip carrier mechanism 9. However, upon such accumulation, operation of the rotary disc 162 is interrupted until sufficient tips have been cleared from the magazine to release the rollers 118 and allow them to move inwardly under operation of the springs 120.

In this connection (see Figures 1, 18 and 18A) the switch 123 is supported on a flexible spring suspension 201 for adjustment by means of adjusting screw 202 so that its contact 124 can be preset to achieve the requisite relation with the roller 121 and spring 120 for switch operation on tip accumulation.

It will be understood that various modifications in the actual detail of the parts and their construction and arrangement may be made from the specific embodiment of the machine illustrated, without departing from the spirit of the invention and scope of the appended claims.

What I claim as my invention is:

1. A machine for applying tips or the like to cigars comprising means to advance a cigar to a tipping station, means for delivering a tip to a point in alignment with a cigar at the tipping station, means for applying an adhesive to the end of a cigar next adjacent said tip delivery point, and means for imparting translational and rotational movement to a cigar tip delivered to said point to effect its application to the adhesive bearing end of a cigar.

2. A machine for applying tips or the like to cigars comprising cigar feeding means to periodically deliver a cigar to a tipping station, a stationary cigar tip magazine having a terminal point located to be in alignment with a cigar at said tipping station, rotary means for delivering tips to said magazine, means for feeding tips in said magazine to said terminal point, and means for periodically advancing a cigar tip from said terminal point onto the end of a cigar at said tipping station while imparting rotational movement to the tip.

3. A machine as claimed in claim 2 in which said means for feeding tips in said magazine to said terminal point comprises a sensing mechanism responsive to accumulation of tips in said magazine, said sensing mechanism being operatively connected to control operation of said rotary means for delivering tips to said magazine to interrupt delivery of tips to said magazine upon accumulation of tips in said magazine.

4. A machine as claimed in claim 2 in which said tip advancing means is arranged to impart a rotational movement to a tip being advanced onto a cigar in a direction to tighten the roll of a cigar.

5. A machine for applying tips or the like to cigars comprising an endless cigar feeding means, an intermittent drive for said cigar feeding means to periodically advance a cigar to a tipping station located at a point along said feeding means, means for clamping a cigar periodically advanced to said tipping station, a stationary cigar tip magazine having a delivery point disposed opposite to said tipping station, means for delivering cigar tips to said magazine, yieldable drive means for delivering cigar tips in said magazine to said delivery point, and means to advance a cigar tip from said delivery point onto the end of a cigar clamped at said tipping station.

6. A machine as claimed in claim 5 in which said yieldable means comprises resilient friction roller means, and means for driving said roller means.

7. A machine as claimed in claim 5 in which said yieldable means comprises ae least one swingably supported roller member disposed to frictionally engage a tip in said magazine, means urging said roller into frictional engagement with a tip in said magazine, and means for driving said roller.

8. A machine as claimed in claim 7 in which said roller is adapted to be displaced against said means urging said roller into frictional engagement with a tip in said magazine upon engagement with a tip, and means responsive to displacement of said roller for controlling said means for delivering tips to said magazine.

9. A machine for applying tips or the like to cigars comprising a platform, means for feeding a cigar along said platform to a tipping station, reciprocable means for elevating a cigar fed to said tipping station above said platform and clampingly supporting same with an end of the cigar exposed clear of obstruction, a tip magazine having a delivery end disposed to deliver a tip to a position in axial alignment with a clamped cigar, means for advancing a tip from said magazine onto the end of a clamped cigar while imparting a rotational movement to the tip, and means for removing a tipped cigar from said tipping station.

10. A machine for applying tips or the like to cigars comprising a platform, means for feeding a cigar along said platform to a tipping station, means for elevating a cigar fed to said tipping station above said platform and clampingly supporting same with an end of the cigar exposed clear of obstruction, means for applying an adhesive to the exposed end of a clamped cigar, a stationary tip magazine having a delivery end disposed to deliver a tip to a position in axial alignment with a clamped cigar, means for advancing a tip from said magazine onto the end of a clamped cigar while imparting a rotational movement to the tip, and means for removing a tipped cigar from said tipping station.

11. A machine for applying tips or the like to cigars comprising a platform, means for feeding a cigar along said platform to a tipping station, reciprocable means for elevating a cigar fed to said tipping station above said platform and clampingly supporting same with an end of the cigar exposed clear of obstruction, a stationary tip magazine having a delivery end disposed to deliver a tip to a position in axial alignment with a clamped cigar, frictional feed means for advancing tips in said magazine to said delivery end, means for advancing a tip fed to the delivery end of said magazine onto the end of a clamped cigar while imparting a rotational movement to the tip, and means for removing a tipped cigar from said tipping station.

12. A machine for applying tips or the like to cigars comprising a platform, means for feeding a cigar along said platform to a tipping station, reciprocable means for elevating a cigar fed to said tipping station above said platform and clampingly supporting same with an end of the cigar exposed clear of obstruction, a stationary tip magazine having a delivery end disposed to deliver a tip to a position in axial alignment with a clamped cigar, a pick-up mechanism for segregating and orienting cigar tips from a randomly disposed mass of same, and feeding such oriented tips to said stationary magazine, feed means for advancing tips fed to said magazine to said delivery end, means for advancing a tip from said magazine onto the end of a clamped cigar while imparting a rotational movement to the tip, and means for removing a tipped cigar from said tipping station.

13. A machine as claimed in claim 12 in which said means for advancing tips in said magazine to said delivery end comprises a sensing mechanism responsive to accumulation of tips in said magazine, and means controlled by said sensing mechanism for interrupting operation of said pick-up mechanism upon accumulation of tips in said magazine.

14. A machine for applying tips or the like to cigars comprising means for feeding a cigar to a tipping station, a tip receving magazine having a delivery end disposed adjacent to said tipping station, means for delivering tips to said delivery end, a partial sleeve carrier mounted for axial reciprocation on the axis of a cigar at said tipping station from a retracted position opposite to the delivery end of said magazine towards and from a cigar at said tipping station, said carrier at said retracted position presenting an open side to said magazine, means for reciprocating said carrier, a partial sleeve cigar tip holder rotatably mounted within said carrier, and means for rotating said holder from a position presenting an open side registering with the open side of said carrier with said carrier in said retracted position to receive a tip from said magazine to a position closing the open side of said carrier as said carrier is moved towards a cigar at said tipping station, whereby said holder is adapted to advance a tip onto a cigar while imparting a rotational movement to a tip carried thereby.

15. A machine for applying tips or the like to cigars comprising a platform, means for feeding a cigar along said platform to a tipping station, means for elevating a cigar fed to said tipping station above said platform and clampingly supporting same with an end of the cigar exposed clear of obstruction, a substantially vertical tip magazine having a lower delivery end disposed to deliver a tip to a position in axial alignment with a clamped cigar, means for feeding tips to said delivery end, a partial sleeve carrier mounted for axial reciprocation on the axis of a clamped cigar from a retracted position beneath the delivery end of said magazine towards and from a clamped cigar, said carrier at said retracted position presenting an open side beneath said magazine delivery end, means for reciprocating said carrier, a partial sleeve cigar tip holder rotatably mounted within said carrier, means for rotating said holder from a position presenting an open side registering with the open side of said carrier with said carrier in said retracted position to receive a tip from said magazine to a position closing the open side of said carrier as said carrier is moved towards a clamped cigar at said tipping station whereby said holder is adapted to advance a tip onto a clamped cigar while imparting a rotational movement to a tip carried thereby, and means for removing a tipped cigar from said tipping station.

16. A machine for applying tips or the like to cigars comprising a platform, means for feeding a cigar along said platform to a tipping station, means for elevating a cigar fed to said tipping station above said platform and clampingly supporting same with an end of the cigar exposed clear of obstruction, a stationary magazine constructed and arranged to guide oriented cigar tips to a delivery end disposed to deliver a tip to position in axial alignment with a clamped cigar, pick-up and orienting mechanism for separating and orienting individual tips from a mass of randomly disposed tips and for delivering tips in desired orientation to said stationary magazine, yieldable means for advancing tips received in said magazine to said delivery end, a partial sleeve carrier mounted for axial reciprocation on the axis of a clamped cigar from a retracted position beneath the delivery end of said magazine towards and from a clamped cigar, said carrier at said retracted position presenting an open side beneath said magazine delivery end, means for reciprocating said carrier, a partial sleeve cigar tip holder rotatably mounted within said carrier, means for rotating said holder from a position presenting an open side registering with the open side of said carrier with said carrier in said retracted position to receive a tip from said magazine to a position closing the open side of said carrier as said carrier is moved towards a clamped cigar at said tipping station whereby said holder is adapted to advance a tip onto a clamped cigar while imparting a rotational movement to a tip carried thereby, and means for removing a tipped cigar from said tipping station.

17. A machine as claimed in claim 16 in which said pick-up and orienting mechanism comprises a rotary member having individual pockets shaped to receive an oriented tip, means to guide tips to said pockets, means to retain oriented tips in said pockets for a partial revolution of said rotary member, track means leading substantially tangentially from said rotary member, said magazine forming a continuation of said track means, and means for directing oriented tips in said pockets along said trackway in oriented position.

18. A machine as claimed in claim 17 having a clutch operated drive for said rotary member, and said yieldable means for advancing tips received in said magazine comprises a sensing mechanism controlling said clutch operating drive and responsive to accumulation of tips in said magazine to interrupt rotation of said rotary member.

19. In a machine for applying tips to cigars a magazine having an inlet end and an outlet end and forming a guideway between said ends for guiding a tip in a predetermined orientation between said ends, rotary means for delivering tips into the inlet end of said magazine with the tips having correct orientation for guided travel through said magazine, means for frictionally driving tips through said magazine, means for receiving individual tips from the outlet end of said magazine and applying same to a cigar, and means to isolate individual tips successively from said magazine and deliver same to said tip applying means.

20. In a machine for applying tips to cigars a magazine having an inlet end and an outlet end forming a delivery station and forming a guideway between said ends for guiding tips oriented in a predetermined manner between said ends, rotary means for delivering tips in requisite orientation into the inlet end of said magazine, yieldable means for driving tips through said magazine to said delivery station and means responsive to accumulation of tips in said magazine to interrupt feed of said rotary tip delivering means.

21. A device as claimed in claim 20 in which said yieldable means comprises at least one pair of friction rollers disposed to engage on opposite sides of a tip in said magazine, and means for positively driving said rollers.

22. A device as claimed in claim 21 in which at least one of said rollers is pivotally supported to move towards and from the other roller upon passage of a tip therebetween, means urging said pivotally supported roller towards said other roller.

23. A device as claimed in claim 22 in which said means for interrupting feed of said tip delivering means comprises a clutch member, and an operator therefor, said operator being actuated by movement of said pivotally supported roller away from said other roller to stop feed of said tip delivering means.

24. A device as claimed in claim 22 in which said means for interrupting feed of said tip delivering means comprises a solenoid operated clutch, and switch means controlling said clutch, said switch being actuated by movement of said pivotally supported roller away from said other roller to stop feed of said tip delivering means.

25. A device as claimed in claim 24 in which said solenoid operated clutch has a direct current operated solenoid, and said switch means is connected in an alternating current circuit, and a rectifier is interposed between said solenoid and said switch means.

26. In a cigar tipping machine a magazine comprising a guideway shaped to hold and guide cigar tips having a predetermined orientation between an inlet to said magazine at one end thereof an a delivery point at the other end thereof, means for delivering tips into the inlet end of said magazine with the tips in requisite orientation, yieldable means for frictionally advancing oriented tips fed into said magazine and feeding same to said delivery point, means for driving said yieldable means, said yieldable means including at least one roller mounted for displacement upon accumulation of tips in said magazine, and means actuated by displacement of said roller to interrupt delivery of tips into the inlet end of said magazine.

27. In a cigar tipping machine a magazine comprising a guideway shaped to hold and guide cigar tips having a predetermined orientation between an inlet to said magazine at one end thereof and a delivery point at the other end thereof, means for delivering tips into the inlet end of said magazine with the tips in requisite orientation, a plurality of rollers disposed to frictionally engage and advance oriented tips fed into said magazine and feed same to said delivery point, means for driving said rollers, at least one of said rollers being displaceably mounted to be displaced upon accumulation of tips in said magazine, and means actuated by the displacement of said latter roller to interrupt delivery of tips into the inlet end of said magazine.

28. In a cigar tipping machine a magazine comprising a guideway shaped to hold and guide cigar tips having a predetermined orientation between an inlet end and an outlet end, positively driven means for delivering tips in requisite orientation into said inlet end, reciprocal carrier means at the outlet end of said magazine to transfer tips singly to a cigar tipping station, means for frictionally feeding tips through said magazine towards said outlet end, reciprocal finger means adjacent to said outlet end timed in relation to said reciprocal carrier to separate a leading tip and deliver same from said magazine to said carrier and to restrain trailing tips in said magazine from movement to said outlet end while said carrier reciprocates to and from said tipping station, said positively driven means being adapted to deliver tips to said magazine at a higher rate than said finger means is adapted to deliver tips to said carrier, and means responsive to accumulation of tips in said magazine to interrupt operation of said positively driven means.

29. A device as claimed in claim 28 in which said means for frictionally feeding tips through said magazine comprises positively driven roller means disposed to rollingly engage tips being fed along said magazine and including a roller displaceable upon accumulation of tips in said magazine to a point to be engaged by said displaceable roller, and said means for interrupting said positively driven means is operatively associated with said displaceable roller means to be actuated thereby upon displacement thereof upon accumulation of tips to said point to be engaged by said displaceable roller.

30. In a cigar tipping machine a magazine comprising a longitudinal guideway shaped to hold and guide cigar tips with the tips disposed in a predetermined orientation between an inlet and an outlet end, positively driven means for delivering tips into the inlet end of said magazine with the tips in requisite orientation, pairs of yieldable rollers disposed to frictionally engage and roll on opposite sides of tips in said guideway at points along said guideway to advance tips towards said outlet end, periodically operated carrier means at the outlet end of said magazine to transfer tips singly to a cigar tipping station, reciprocal finger means adjacent to said outlet end timed in relation to said carrier to separate a leading tip and deliver same from said magazine to said carrier and to restrain trailing tips in said magazine from movement to said outlet end until said carrier is ready to receive a subsequent tip, said positively driven means being adapted to deliver tips to said magazine at a higher rate than said finger means is adapted to deliver tips to said carrier whereby tips are adapted to be accumulated in said magazine, said rollers providing a slip drive on tips in said magazine upon tip accumulation, at least one of said rollers being displaceable upon accumulation of tips in said magazine, and means responsive to displacement of said latter roller to interrupt drive to said positively driven means for delivering tips into the inlet end of said magazine.

31. A device as claimed in claim 30 in which said positively driven tip delivering means comprises a rotary member having pockets therein shaped to correspond to the shape of a tip, means for introducing tips into said pockets to take up orientations predicated by the disposition of said pockets and means to remove oriented tips from said pockets and deliver same to said magazine.

32. In a cigar tipping machine a container to receive a quantity of randomly disposed tips, each having a cylindrical cigar receiving portion and a reduced mouth piece portion, a vertical rotary disc member mounted to rotate about a horizontal axis adjacent to said container and having a plurality of circumferentially spaced pockets extending radially inwardly from the outer periphery and shaped to receive a radially disposed tip with the mouth piece portion thereof disposed radially outwardly of the pocket, said rotary member being thinner than the diameter of the cigar receiving portions of said tips, whereby a tip received in one of said pockets is adapted to extend on opposite faces of said rotary disc member, guide means on opposite faces of said rotary disc member in the vicinity of said pockets, said guide means exposing at least the lower part of one side of said rotary disc member facing said container immediately radially inwardly of said pockets, chute means leading from said container to the exposed part of said disc to conduct tips to successively arriving pockets on disc rotation, said pockets being adapted to receive tips which orient themselves at the bottom of said disc mouth piece radially outwardly and presenting shoulder means to support only mouth pieces having said orientation between said guide means as said pockets arrive at the top of said disc whereby mouth pieces having an orientation different from said orientation are dropped out of said pockets as said pockets approach the top of said disc, said guide means presenting a track portion to substantially tangentially remove tips carried in the direction of rotation of said disc past the top of said disc, and a magazine fed from said rotary disc and comprising a trackway forming a continuation of said track portion.

33. A device as claimed in claim 32 having rotary finger means to engage tips removed from said pockets by said track portion and deliver such tips to said magazine.

34. A device as claimed in claim 32 having oscillating finger means to agitate tips moving down said chute to the lower part of said disc.

35. A device as claimed in claim 34 having rotary driven means for agitating tips out of said container into said chute.

36. A device as claimed in claim 32 in which said disc has a clutch operated drive, and means responsive to accumulation of tips in said magazine for actuating the clutch of said drive to interrupt disc rotation.

37. In a cigar tipping machine, a container for receiving a supply of randomly disposed tips, chute means for leading from said container for gravity feeding tips in random orientation from said container, rotary tip selecting means for lifting tips from said chute at the bottom of its rotary path and having means to reject all but tips of a predetermined orientation at the top of its rotary path, guide means to pick off from said rotary means any tip of predetermined orientation retained thereby, and a magazine to receive tips of predetermined orientation picked off by said guide means.

38. A device as claimed in claim 37 in which said magazine has associated therewith a sensing mechanism responsive to accumulation of tips in said magazine, and means actuated by said sensing mechanism for interrupting rotation of said rotary means.

References Cited in the file of this patent
UNITED STATES PATENTS

| | | |
|---|---|---|
| 1,830,446 | Schunemann | Nov. 3, 1931 |
| 2,571,576 | Hopkins | Oct. 16, 1951 |
| 2,827,904 | Halstead | Mar. 25, 1958 |